(No Model.)

G. A. & G. W. SAMMET.
MANUFACTURE OF FILLING FOR MATTRESSES, PILLOWS, &c., FROM FEATHERS.

No. 263,433. Patented Aug. 29, 1882.

Witnesses.
H. W. Stearns.
E. E. Masson

Inventors.
George A. Sammet,
George W. Sammet,
pr Norman W. Stearns,
Attorney.

UNITED STATES PATENT OFFICE.

GEORGE A. SAMMET AND GEORGE W. SAMMET, OF BOSTON, MASS.

MANUFACTURE OF FILLING FOR MATTRESSES, PILLOWS, &c., FROM FEATHERS.

SPECIFICATION forming part of Letters Patent No. 263,433, dated August 29, 1882.

Application filed May 2, 1882. (No model.)

*To all whom it may concern:*

Be it known that we, GEORGE A. SAMMET and GEORGE W. SAMMET, citizens of the United States, residing at Boston, in the county of Suffolk and State of Massachusetts, have invented certain new and useful Improvements in the Manufacture of Filling for Mattresses, Pillows, &c.; and we do hereby declare the following to be a full, clear, and exact description of the invention, such as will enable others skilled in the art to which it appertains to make and use the same.

Figure 1:
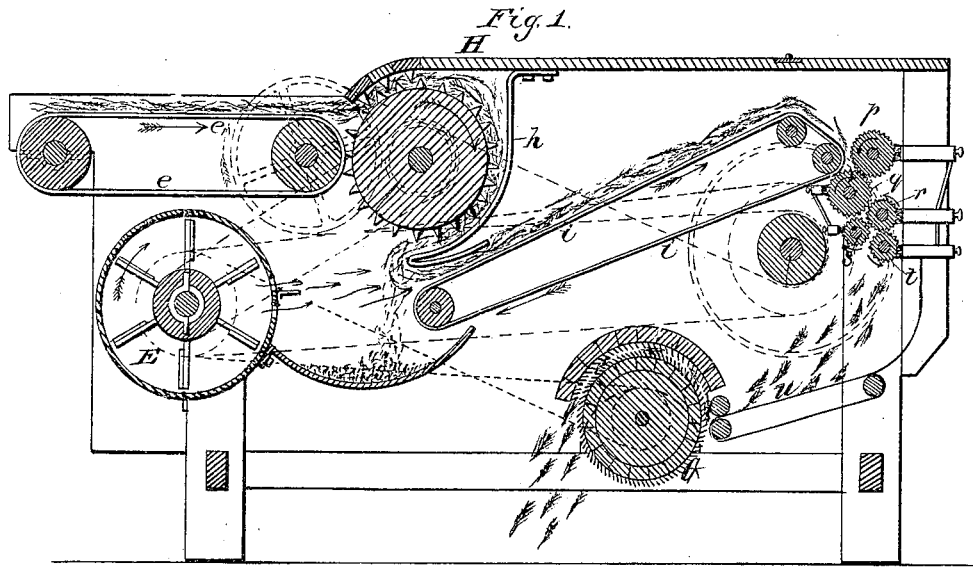
Figure 2:
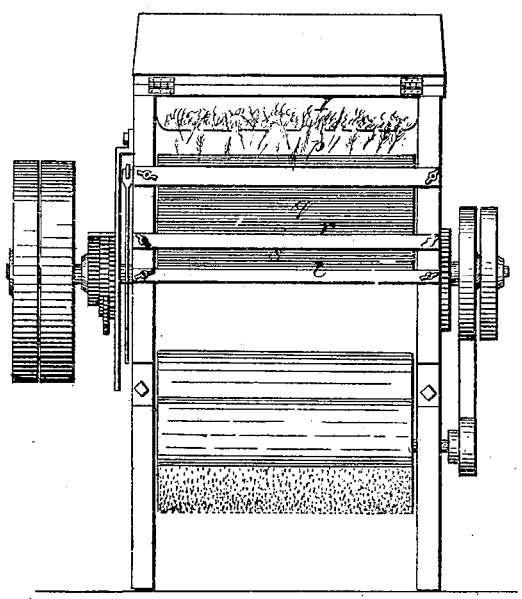

Figure 1 is a longitudinal section through the center of a machine for preparing feathers for bedding, &c., constructed in accordance with our invention. Fig. 2 is an end elevation of the same.

Our present invention has special reference to certain mechanism for treating feathers for which Letters Patent of the United States were granted to us on the 30th day of May, 1882, No. 258,607; and this invention consists in the combination of a carder with the essential features of our said previous invention—viz., a picker, an air-blast, and a series of corrugated or fluted rolls—the object of the carder being to comb out the foliage and still further increase the elasticity of the feathers; and this invention also consists in the product—viz., the improved feather filling—obtained from the above-described method of treatment, the coarser grades—such as the tail and wing feathers, heretofore unfit for filling—being utilized, and the elasticity of the fine grades of feathers being also increased thereby.

In the said drawings, H represents a picker, to which the feathers are fed by means of a hopper or endless apron, $e$, whereby they are loosened and separated in case of being bunched or matted together, the dirt and foreign matter being directed by a guide, $h$, down away to a receptacle thereunder, and the feathers being carried by the blast of a fan, E, upon a traveling endless apron, $i$, to and through a series of corrugated or fluted rolls, $p\ q\ r\ s\ t$. These rolls are made adjustable to and from each other, and are provided with corrugations of different degrees of fineness, the upper rolls being preferably coarser than the lower ones. The coarser grades of feathers are gradually reduced by the successive action of the entire series of rolls upon their stems or quills, the upper rolls being separated or removed when the finer grades of feathers are to be treated. By the passage through the rolls the feathers are gradually curled, crimped, crushed, or broken and intimately and finely bent or reduced, so as to render the fibers of their stems pliable and soft, after which the feathers so treated are conducted on an apron, $u$, to a carder, G, which combs out and separates the foliage, and also slightly splits and still further breaks up and reduces the stems or quills, thus endowing the several portions of the feathers, both quill and foliage, with a maximum degree of elasticity, softness, and lightness, and increasing the bulk of the filling with a determinate weight of feathers. By means of our mode of treatment the fiber or bark of the foliage retains its natural length, and its strength is not injured thereby, while the elastic properties of a finer grade of feathers are much improved by their passage through an apparatus constructed in accordance with our invention. Where a filling composed of stems and foliage, both chopped fine, is employed, the rigidity of the short stumps remains, the elasticity of the foliage is destroyed, and much dust formed by the cutting process, such filling packing closely, and the quantity thereof required for an article, consequently its weight and expense, being thereby increased.

We intend to employ as a filling for mattresses, pillows, and general upholstery purposes feathers of all grades, both fine and coarse, when curled, crimped, crushed, or combed, our said filling being composed entirely of one grade of feathers so treated, or of more than one grade so treated, or of one or more grades of feathers so treated mixed with a fine grade of feathers not so treated.

We claim—

1. A filling composed of feathers rendered soft, pliant, and elastic by curling, crimping, crushing, or breaking their quills or stems and combing out their foliage, said filling consisting of one grade only, or of a mixture of grades of feathers so treated, or of one or more grades so treated combined with a fine grade of feathers not curled, crimped, crushed, or broken, as set forth.

2. A carder, G, in combination with a picker,

H, an air-blast or fan-blower, E, and a series of corrugated or fluted rolls, $p\ q\ r\ s\ t$, constructed to operate substantially in the manner and for the purpose described.

3. The within-described mode of treating feathers by first passing them through a picker, next in subjecting them to the action of a fan-blower or other air-blast, then to a series of corrugated or fluted rolls, afterward to a carder, and finally cleansing them by well-known means, as specified.

In testimony whereof we have affixed our signatures in presence of two witnesses.

GEORGE A. SAMMET.
   GEORGE W. SAMMET.

Witnesses:
 CHAS. E. WIGGIN,
 ARTHUR C. WIGGIN.